A. W. ECKHARDT.
PNEUMATIC VEHICLE WHEEL.
APPLICATION FILED SEPT. 7, 1917.
1,251,357.
Patented Dec. 25, 1917.
2 SHEETS—SHEET 2.
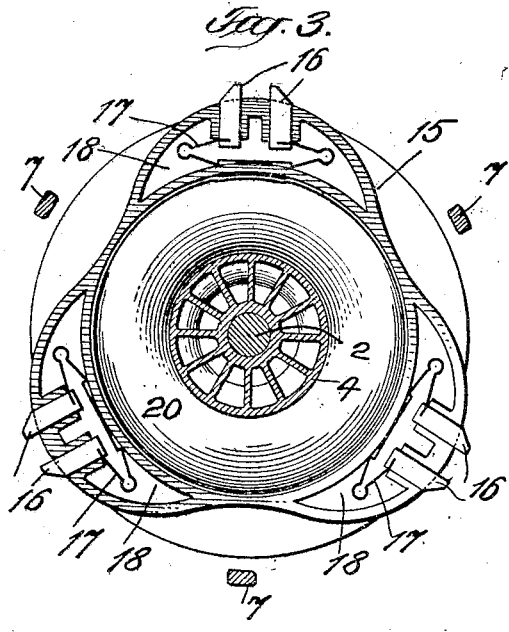
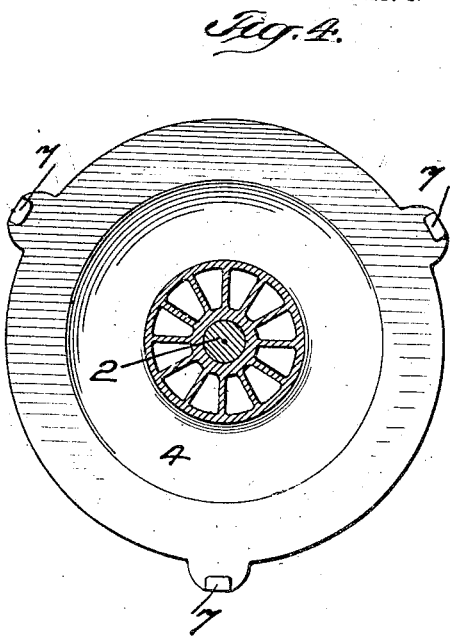
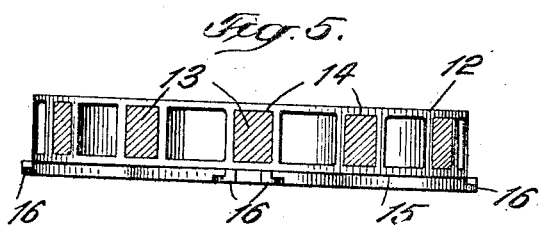
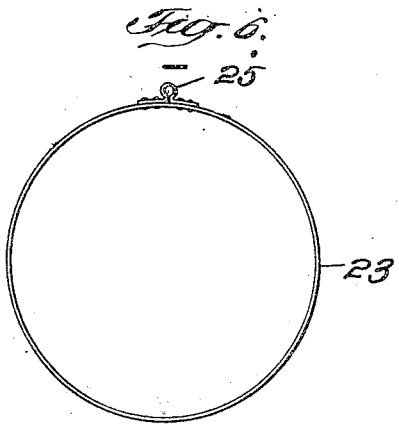
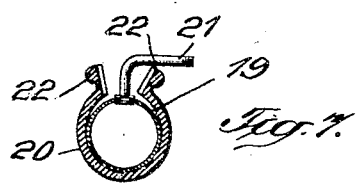
INVENTOR
Adolph W. Eckhardt
BY
ATTORNEY

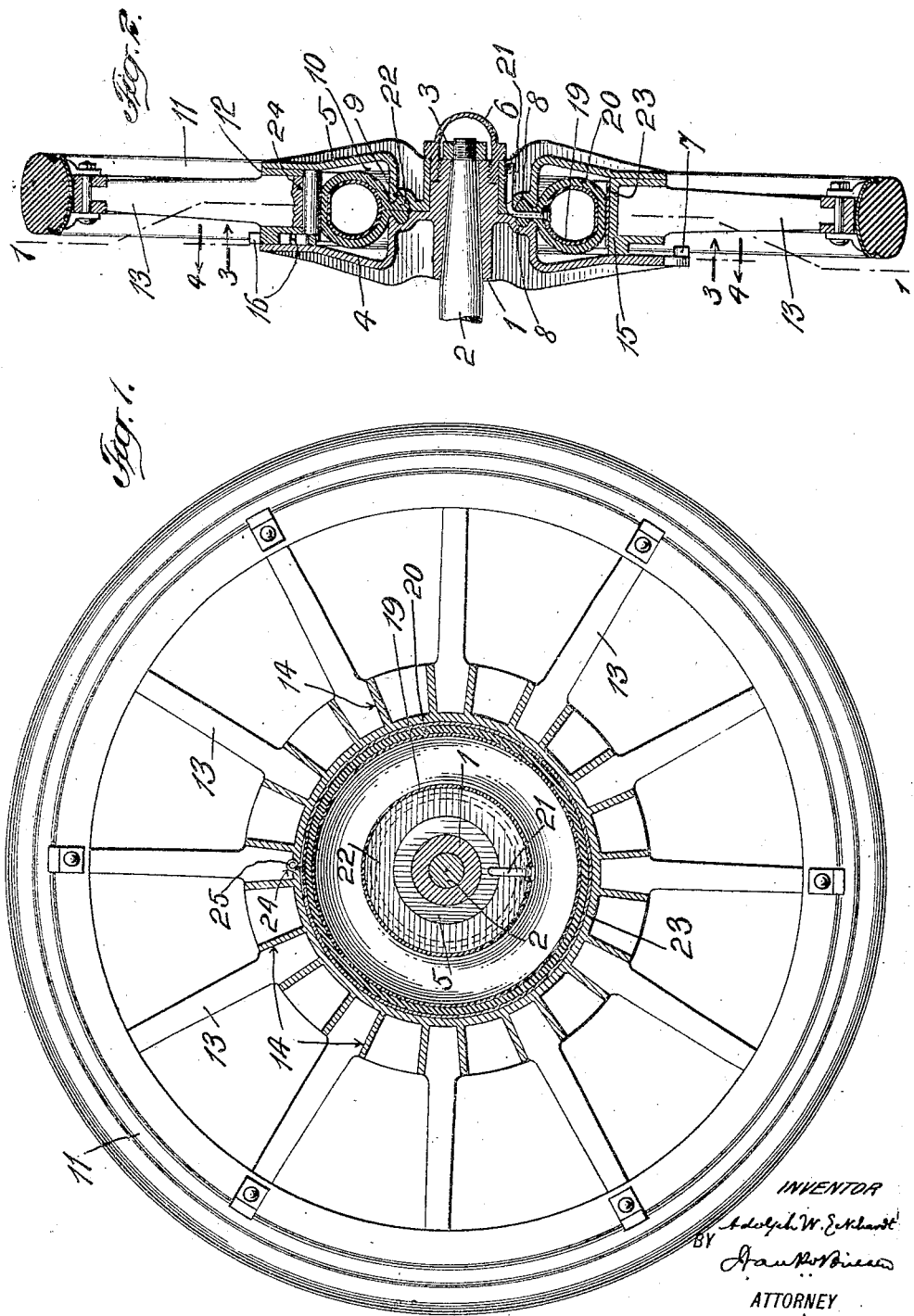

UNITED STATES PATENT OFFICE.

ADOLPH W. ECKHARDT, OF NEW YORK, N. Y.

PNEUMATIC VEHICLE-WHEEL.

1,251,357.            Specification of Letters Patent.    Patented Dec. 25, 1917.

Application filed September 7, 1917. Serial No. 190,151.

*To all whom it may concern:*

Be it known that I, ADOLPH W. ECKHARDT, a citizen of the United States, and a resident of New York city, in the county and State of New York, have invented certain new and useful Improvements in Pneumatic Vehicle-Wheels, of which the following is a specification.

This invention relates to a pneumatic vehicle wheel of novel construction, which is so constituted that upon a deflation of the pneumatic tube, the rim section of the wheel will become automatically locked to and centered around the hub section, so that in this way, travel need not be interrupted. The invention comprises more particularly, novel means by which motion is transmitted normally from the hub section to the floating rim section, novel means for centering the rim section either during a forward or rearward movement of the car, upon the deflation of the air tube, and various other features of improvement more fully pointed out in the specification and appended claims.

In the accompanying drawings:

Figure 1 is a longitudinal section of a wheel embodying my invention, on line 1—1 Fig. 2;

Fig. 2, a cross section thereof;

Fig. 3, a section on line 3—3 Fig. 2;

Fig. 4, a section on line 4—4 Fig. 2;

Fig. 5, a detail of the annular member;

Fig. 6, a detail of the strap, and

Fig. 7, a cross section through the shoe and adjoining parts.

The wheel is composed essentially of a hub section, a rim section, and an intermediate pneumatic tube that transmits motion from the former to the latter.

The hub section comprises a hub proper 1 which is keyed to the axle 2, by means of a nut 3. Hub 1 is encompassed by a pair of face plates 4 and 5 of which inner plate 4 is shown to be made integral with the hub, while outer plate 5 is keyed thereto by a nut 6. From the rim of one of the plates, (preferably plate 4) there project a number of lugs or members 7, for a purpose hereinafter described. P¹ tes 4 and 5 are provided with circular hub sections 8, that abut against each other, and are furnished with a groove 9, at their junction. This groove opens into an annular recess 10, formed between the inner sides of face plates 4 and 5, said face plates converging from their hubs toward their free outer ends, said ends being however parallel.

The rim section of the wheel comprises a rim proper 11 (which is shown to carry a solid tire) and an inner concentric annulus or drum 12, which may be connected to the rim in suitable manner such as by spokes 13, that enter outer sockets 14 of the drum. The latter is of such a width as to be accommodated within the outer portion of recess 10 and to be revoluble therein. Drum 12 is provided at one of its faces with a flange 15 which is made of concavo-convex or sinuous form, so as to embody a plurality of outwardly extending convex or salient sections, and a plurality of intervening inwardly extending concave or reëntrant sections. In other words, the flange is so shaped that it will alternately approach toward and recede from the wheel axle in gradual curves. Each of the outer sections (of which three are shown) is provided with radial ways for the reception of a pair of spaced radially slidable latches 16 which are normally projected a distance beyond the flange by means of a spring 17. This spring is seated within an opening or chamber 18, formed within each of the salient sections of the flange.

Within the annular chamber 10 formed between the circular outer periphery of hubs 8, the circular inner periphery of drum 12, and the converging sections of face plates 4 and 5, there is seated a circular air tube 19 encompassed by a circular shoe 20, the air tube being provided with the charging nipple 21.

Shoe 20 is split longitudinally and provided at each of its abutting edges with a bead 22, the two beads being conjointly received within the groove 9, so that in this way, the shoe is closed and taken along positively by the hub section of the wheel.

Drum 12 incloses a circular friction strap 23, preferably made of leather, and provided with a transversely extending projection 25 which is received within a corresponding groove 24 of drum 12.

During the normal operation of the wheel, the rim section will be floated in the recess 10 of the hub section, and will be taken along thereby, the pneumatic tube together with the shoe constituting the cushioning element for the wheel as well as the motion transmitting means.

In case the air tube becomes broken and deflated, the car body together with the hub section will sag momentarily, and as the hub section will now turn at a greater speed than the lagging rim section, the projections 7 of face plate 4, will be brought into engagement with the flange 15 which thus constitutes a track. In a very short time, the lugs 7 will in this way, be made to enter between the two members of each pair of latches 16, against the action of springs 17, the latches resuming their normal position as soon as they are cleared by the lugs. By this engagement, between lugs and latches, the rim section will become centered upon and locked automatically to the hub section, so as to be taken along thereby, with the elimination of the pneumatic device as a motion transmitting medium.

It will be seen that by my invention, the rim will be quickly centered upon and locked to the hub section, upon a deflation of the pneumatic tube, and that such locking and centering action will take place both during a forward or backward movement of the car. Furthermore, as the air tube as well as the shoe are normally of true circular form, and are accommodated within a circular housing, they may be readily manufactured and are not liable to become injured by abrasion. When the car has reached the garage repairs may be made or a new air tube fitted in position, but the travel need not be interrupted at that point on the road where the tube has become punctured.

I claim:

1. A vehicle wheel comprising a hub section having an annular recess, a rim section having an annular member engaging said recess, said annular member being provided with a sinuous track, a pneumatic tube within said recess that is interposed between the hub section and the rim section, a member on the hub section that is adapted to engage said track and means for locking the hub section to the rim section.

2. A vehicle wheel comprising a hub section having a pair of face plates, a rim section having an annular member that is received between the face plates, said annular member having a sinuous flange, a member on the hub section adapted to engage said flange, means for interlocking said member with said flange and a pneumatic tube between the hub section and the rim section.

3. A vehicle wheel comprising a hub section having a pair of face plates, one of said plates having a plurality of lugs, a rim section having an annular member that is received between the face plates, said annular member being provided with a sinuous flange having alternating salient and reëntrant sections, and spring-controlled latches on the salient sections that are adapted to be engaged by the lugs.

4. A vehicle wheel comprising a pair of face plates having annular hubs, one of said face plates having lugs, a rim section having an annular member adapted to be received between the face plates, a sinuous flange on the annular member, spring-controlled latches extending from the salient sections of said sinuous flange and adapted to be engaged by said lugs, and a shoe interposed between the hubs and the annular member.

5. A vehicle wheel comprising a pair of face plates having annular hubs, one of said face plates having lugs, a rim section having an annular member adapted to be received between the face plates, a sinuous flange on the annular member, spring-controlled latches extending from the salient sections of said sinuous flange and adapted to be engaged by said lugs, a shoe interposed between the hubs and the annular member, and means for locking said shoe to said hubs.

ADOLPH W. ECKHARDT.